United States Patent
Cluff et al.

(10) Patent No.: US 11,724,306 B1
(45) Date of Patent: Aug. 15, 2023

(54) COATING COMPOSITION EMBODIMENTS FOR USE IN INVESTMENT CASTING METHODS

(71) Applicant: Triad National Security, LLC, Los Alamos, NM (US)

(72) Inventors: Kyle Cluff, Los Alamos, NM (US); Matthew Lee, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 0 days.

(21) Appl. No.: 17/358,780

(22) Filed: Jun. 25, 2021

Related U.S. Application Data

(60) Provisional application No. 63/044,712, filed on Jun. 26, 2020.

(51) Int. Cl.
| | |
|---|---|
| *B22C 1/18* | (2006.01) |
| *C04B 28/24* | (2006.01) |
| *C04B 28/30* | (2006.01) |
| *C04B 28/34* | (2006.01) |
| *C04B 22/08* | (2006.01) |
| *B22C 7/02* | (2006.01) |
| *C04B 14/02* | (2006.01) |
| *C04B 111/76* | (2006.01) |

(52) U.S. Cl.
CPC .............. *B22C 1/181* (2013.01); *B22C 1/185* (2013.01); *B22C 7/02* (2013.01); *C04B 14/024* (2013.01); *C04B 22/082* (2013.01); *C04B 28/24* (2013.01); *C04B 28/30* (2013.01); *C04B 28/344* (2013.01); *C04B 2111/763* (2013.01)

(58) Field of Classification Search
CPC ..... C04B 14/024; C04B 22/082; C04B 28/24; C04B 28/30; C04B 28/344; C04B 2111/763; B22C 1/181; B22C 1/185; B22C 7/02
See application file for complete search history.

(56) References Cited

U.S. PATENT DOCUMENTS

| | | |
|---|---|---|
| 4,331,197 A | 5/1982 | Cole |
| 4,361,181 A | 11/1982 | Wischnack et al. |
| 4,399,858 A | 8/1983 | Kurabe et al. |
| 4,438,804 A | 3/1984 | Aiga et al. |
| 4,629,708 A | 12/1986 | Alexander et al. |
| 4,922,991 A | 5/1990 | Pitcher et al. |
| 4,925,492 A | 5/1990 | Kelkar et al. |
| 5,127,461 A | 7/1992 | Matsunaga et al. |
| 5,143,665 A | 9/1992 | Clubbs et al. |
| 5,232,610 A | 8/1993 | McLaughlin et al. |
| 5,262,100 A | 11/1993 | Moore et al. |
| 5,273,098 A | 12/1993 | Hyndman et al. |
| 5,303,761 A | 4/1994 | Flessner et al. |
| 5,320,157 A | 6/1994 | Siak et al. |
| RE35,334 E | 9/1996 | Moore et al. |
| 5,803,151 A | 9/1998 | Carden |
| 5,921,312 A | 7/1999 | Carden |
| 6,024,787 A | 2/2000 | Lee |
| 6,139,619 A | 10/2000 | Zaretskiy et al. |
| 6,467,525 B2 | 10/2002 | Herreid et al. |
| 6,755,238 B1 | 6/2004 | Hirokawa |
| 8,029,614 B2 | 10/2011 | Zenpo et al. |
| 8,403,028 B2 | 3/2013 | Groezinger |
| 8,490,677 B2 | 7/2013 | Zenpo et al. |
| 8,528,626 B2 | 9/2013 | Zenpo et al. |
| 8,574,476 B2 | 11/2013 | Yamada |
| 8,627,877 B2 | 1/2014 | Gerlach |
| 2004/0238157 A1 | 12/2004 | Hori et al. |
| 2006/0147484 A1* | 7/2006 | Hestand ................ A61K 33/14 424/401 |
| 2014/0251571 A1 | 9/2014 | Kotani et al. |

FOREIGN PATENT DOCUMENTS

| | | | |
|---|---|---|---|
| CN | 103143673 A | * | 6/2013 |
| CN | 103878298 A | * | 6/2014 |
| CN | 106400090 A | * | 2/2017 |
| CN | 107434933 A | * | 12/2017 |
| CN | 110438481 A | * | 11/2019 |
| JP | 2019127561 A | * | 8/2019 |
| SU | 721294 A | * | 3/1980 |
| SU | 1199425 A | * | 12/1985 |
| SU | 1245620 A1 | * | 7/1986 |
| SU | 1380844 A1 | * | 3/1988 |

* cited by examiner

*Primary Examiner* — Anthony J Green
(74) *Attorney, Agent, or Firm* — Klarquist Sparkman, LLP

(57) ABSTRACT

Disclosed herein are embodiments of a coating composition for use in investment casting. The coating composition embodiments provide a solidified coat that can be as a mold for casting castable materials and that is easily removed from the casted material using water. The coating composition embodiments disclosed herein are reusable and are non-toxic and exhibit high thermal stability.

10 Claims, 3 Drawing Sheets

US 11,724,306 B1

COATING COMPOSITION EMBODIMENTS FOR USE IN INVESTMENT CASTING METHODS

CROSS REFERENCE TO RELATED APPLICATION

This application claims the benefit of the earlier filing date of U.S. Provisional Patent Application No. 63/044,712, filed on Jun. 26, 2020; this prior application is incorporated herein by reference in its entirety.

ACKNOWLEDGMENT OF GOVERNMENT SUPPORT

This invention was made with government support under Contract No. 89233218CNA000001 awarded by the U.S. Department of Energy/National Nuclear Security Administration. The government has certain rights in the invention.

FIELD

The present disclosure concerns embodiments of a coating composition for investment casting of three-dimensional products, along with method embodiments for making and using the coating composition.

BACKGROUND

Investment casting involves using a sacrificial "pattern" or "template" in combination with an external coating material to provide a mold having a desired shape into which a molten metal can be poured upon removing the sacrificial pattern/template. After the metal is casted in the mold, the coating is removed to provide a final metal component. Current investment casting methods use coating and/or pattern/template materials that are difficult to remove and often require physical removal by chipping away the coating. As such, it can be difficult to remove the coating from metal castings that have intricate shapes and/or internal voids. Other methods in the art rely on coatings that require starting materials that either are toxic on their own and/or produce toxic side products during the investment casting process. Also, many coatings are not compatible with particular metals and/or the temperature parameters required by the casting method as components of the coatings are easily oxidized and/or can react with other components at high temperatures resulting in degradation of the coating's integrity and/or consistency leading to poor mold stability. There exists a need in the art for new coating compositions that can be used to provide stable molds for intricate/complex parts and that can be easily removed without harming the structural integrity of the casted component and/or leaving behind undesired amounts/deposits of the coating.

SUMMARY

Disclosed herein are embodiments of a coating composition comprising: a binder component; and a solvent component in which the binder component is soluble at a dissolution rate of 10 g/100 mL or higher; and wherein the binder component does not substantially decompose, melt, or undergo side reactions at temperatures from 400° C. to 1700° C. Additional features of such composition embodiments are described herein.

Also disclosed herein are embodiments of a method, comprising: (i) providing a template component; (ii) exposing the template component to a coating composition comprising a binder component and a solvent component to provide a coated template component, wherein the binder component is soluble in the solvent component at a dissolution rate of 10 g/100 mL or higher and wherein the binder component does not decompose, melt, or undergo side reactions at a temperature of 500° C. or higher; and (iii) drying the coating composition to provide a solidified coat that covers, or substantially covers the template component. In some embodiments, the method further comprises (iv) heating the coated template component at a temperature sufficient to burn away the template component, leaving behind the solidified coat, or dissolving the template component using an organic solvent to leave behind the solidified coat; (v) adding a castable material into the solidified coat; and (vi) washing away the solidified coat to provide a casted component. Additional features of the method are described herein.

The foregoing and other objects and features of the present disclosure will become more apparent from the following detailed description, which proceeds with reference to the accompanying figures.

BRIEF DESCRIPTION OF THE DRAWINGS

FIG. 2A shows a printed template component prior to exposure to a coating composition embodiment; FIG. 2B shows the printed template component comprising a dried coating provided by exposing the template component to a coating composition embodiment comprising a phosphate binder component and a graphite-based filler component; FIG. 2C shows the resulting casting (e.g., tin casting) created using the frame of the solidified coating after the template component has been removed and a castable material (e.g., tin) has been placed inside the solidified coat (e.g., by pouring); and FIG. 2D shows another view of the casted product after the solidified coating has been removed (e.g., washed away).

DETAILED DESCRIPTION

Overview of Terms

Figure 1:
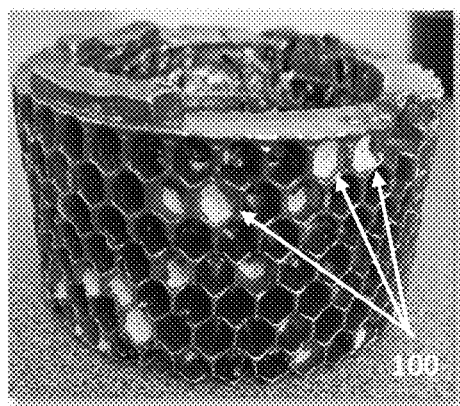
FIG. 1 is a photographic image showing results from using a conventional commercial silica-based composition (sold commercially as SuspendaSlurry® FS) to prepare a casted product; as can be seen in FIG. 1, the coating formed by the silica-based composition is only partially removed from the casted product (evidenced by the bright white portions remaining on the casted component), even after physically chipping away the coating using tools and a pressure washer.

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Although the steps of some of the disclosed methods are described in a particular, sequential order for convenient presentation, it should be understood that this manner of description encompasses rearrangement, unless a particular ordering is required by specific language set forth below. For example, steps described sequentially may in some cases be rearranged or performed concurrently. Additionally, the description sometimes uses terms like "produce" and "provide" to describe the disclosed methods. These terms are high-level abstractions of the actual steps that are performed. The actual steps that correspond to these terms will vary depending on the particular implementation and are readily discernible by one of ordinary skill in the art.

Unless explained otherwise, all technical and scientific terms used herein have the same meaning as commonly understood to one of ordinary skill in the art to which this disclosure belongs. Although methods and compounds similar or equivalent to those described herein can be used in the practice or testing of the present disclosure, suitable methods and compounds are described below. The compounds, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

To facilitate review of the various embodiments of the disclosure, the following explanations of specific terms are provided. A person of ordinary skill in the art would recognize that the definitions provided below, and the compounds and formulas included herein are not intended to include impermissible substitution patterns (e.g., methyl substituted with 5 different groups, and the like). Such impermissible substitution patterns are easily recognized by a person of ordinary skill in the art. Any functional group disclosed herein and/or defined above can be substituted or unsubstituted, unless otherwise indicated herein.

Aliphatic: A hydrocarbon group having at least one carbon atom to 50 carbon atoms ($C_{1-50}$), such as one to 25 carbon atoms ($C_{1-25}$), or one to ten carbon atoms ($C_{1-10}$), and which includes alkanes (or alkyl), alkenes (or alkenyl), alkynes (or alkynyl), including cyclic versions thereof, and further including straight- and branched-chain arrangements, and all stereo and position isomers as well. Cyclic aliphatic groups comprising alkenes are distinct from aromatic groups.

Aromatic: A cyclic, conjugated group or moiety of, unless specified otherwise, from 5 to 15 ring atoms having a single ring (e.g., phenyl) or multiple condensed rings in which at least one ring is aromatic (e.g., naphthyl, indolyl, or pyrazolopyridinyl); that is, at least one ring, and optionally multiple condensed rings, have a continuous, delocalized π-electron system. Typically, the number of out of plane π-electrons corresponds to the Hückel rule (4n+2). The point of attachment to the parent structure typically is through an aromatic portion of the condensed ring system. For example,

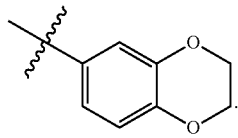 [SMILES: *c1ccc2c(c1)OCCO2]

However, in certain examples, context or express disclosure may indicate that the point of attachment is through a non-aromatic portion of the condensed ring system. For example,

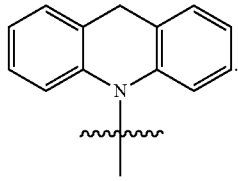 [SMILES: *N1c2ccccc2Cc2ccccc21]

An aromatic group or moiety may comprise only carbon atoms in the ring, such as in an aryl group or moiety, or it may comprise one or more ring carbon atoms and one or more ring heteroatoms comprising a lone pair of electrons (e.g., S, O, N, P, or Si), such as in a heteroaryl group or moiety. Aromatic groups may be substituted with one or more groups other than hydrogen, such as aliphatic, heteroaliphatic, haloaliphatic, haloheteroaliphatic, aromatic, or an organic functional group.

Binder Component: A chemical compound that exhibits solubility in aqueous compositions and that does not substantially degrade or melt or undergo side reactions at high temperatures and that can retain structural stability (e.g., does not substantially deform or soften) at high temperatures. In some embodiments, high temperatures can be those ranging from 400° C. to 1750° C., such as 450° C. to 1500° C., or 450° C. to 1250° C., or 450° C. to 1000° C., or 450° C. to 900° C. In some embodiments, the binder component is capable of avoiding substantial degradation and/or melting, and avoids side reactions at high temperatures and/or retains structural integrity at high temperatures ranging from 400° C. to 900° C. for a period of time ranging from 1 hour to 12 hours and at high temperatures ranging from 450° C. to 1750° C. for a period of time ranging from 5 minutes to 30 minutes.

Filler Component: A solid material that can be used to increase the viscosity of a coating composition (relative to a coating composition without the filler component) and/or that provides additional stability and/or strength to the coating composition (and/or the solidified coat formed therefrom). In an independent embodiment, the filler component is not, or does not comprise, silica or a sand material.

Heteroaliphatic: An aliphatic group comprising at least one heteroatom to 20 heteroatoms, such as one to 15 heteroatoms, or one to 5 heteroatoms, which can be selected from, but not limited to oxygen, nitrogen, sulfur, silicon, boron, selenium, phosphorous, and oxidized forms thereof within the group. Alkoxy, ether, amino, disulfide, peroxy, and thioether groups are exemplary (but non-limiting) examples of heteroaliphatic groups.

Phosphate Compound: A chemical compound comprising a phosphate group having a structure $P(O)O_3^{-3}$, wherein one or more of the negatively-charged oxygen atoms can be balanced with one or more positively-charged counterions. Suitable positively-charged counterions can include, but are not limited to, alkali metal ions, such as $K^+$, $Na^+$, $Li$; ammonium ions, such as $^+N(R')_4$, wherein each R' independently is aliphatic, heteroaliphatic, aromatic, or any combination thereof; or alkaline metal earth ions, such as $[Ca^{2+}]_{0.5}$, $[Mg^{2+}]_{0.5}$, or $[Ba^{2+}]_{0.5}$ (a subscript "0.5" means, for example, that one of the counter ions for such divalent alkali earth ions can be the phosphate compound and the other a typical counter ion such as chloride, or two phosphate groups can serve as counter ions for such divalent alkali earth ions, or a single phosphate group can serve as the counter ion for such divalent alkali earth ions). In an independent embodiment, the phosphate compound is not phosphate glass, which is an amorphous, water-soluble material that includes phosphoric oxide, $P_2O_5$, as the principal constituent with other compounds, such as alumina and magnesia or sodium oxide and calcium oxide.

Side Reactions: Reactions that occur between a binder component and another component of the coating composition, a template component, and/or a castable material and that deleteriously affect the binder component's ability to provide a solidified coat formed from the coating composition and/or the ability to be removed from the castable material after casting.

Solvent Component: A fluid (e.g., a liquid) in which a binder component exhibits solubility and/or that facilitates forming a coat from the coating composition. In some embodiments, the solvent component can comprise a single solvent or a combination of solvents (which can be used in combination in the sense that they are mixed together to form a mixed solvent system or they are used in combination with the binder component, but not necessarily at the same time as each other). In some embodiments, the solvent component comprises an aqueous solvent (e.g., water), an organic solvent, or a combination thereof.

Template Component: A three-dimensional object that serves as a sacrificial template in method embodiments disclosed herein. A template component provides a "pattern" from which a solidified coat made from the coating composition can be prepared.

Introduction

Investment casting using coatings that serve as a mold for producing metal components is a technique that has been used to provide metal components for various different applications. Conventional investment casting methods, however, using coating compositions that have various drawbacks. For example, many coating compositions cannot simply be washed away and instead must be physically chipped away from the metal part after its formation. This can prevent producing pristine parts and instead can result in parts with structural defects and/or flaws that harm desired properties/appearance. For example, FIG. 1 shows a casted component made with a commercially available silica composition (sold under the tradename SuspendaSlurry® FS) and shows that the ceramic coat provided by the silica composition is only partially removed, even after physical chipping away of the coat and pressure washing (as evidenced by the remaining white portions 100 in FIG. 1). Other conventional coatings are not compatible with plastic "templates" and/or are limited to use with templates having less intricate structures. Conventional coating materials also cannot withstand high temperatures used during the casting process, which limits their application and the types of metals with which they can be used. Further drawbacks of conventional coating materials include the toxic side products (e.g., $SO_2$ gas) formed from certain compounds used in the coating.

Figure 2A:
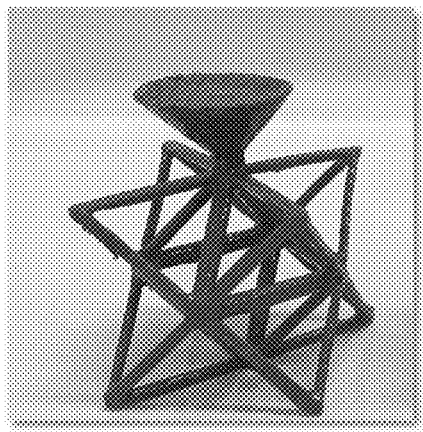
FIGS. 2A-2D are photographic images showing different exemplary steps of a method embodiment according to the present disclosure and how the method can enable casting of objects, even of small-sized, structurally complex objects.
Figure 2B:
Figure 2C:
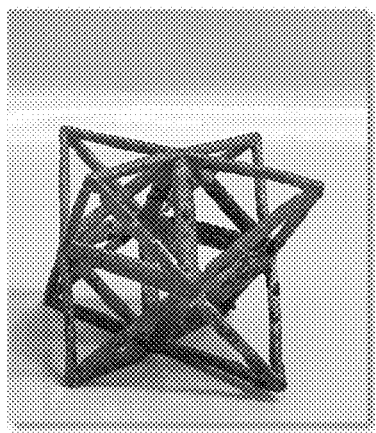
Figure 2D:
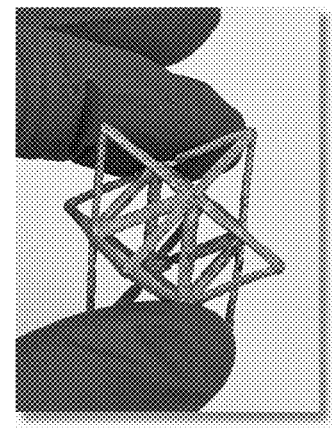
Figure 3A:
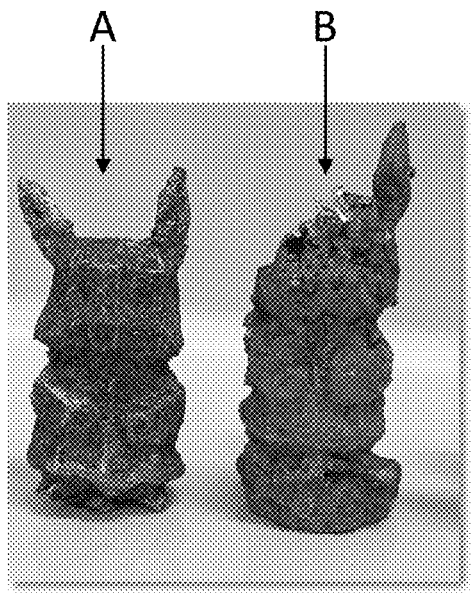
FIGS. 3A-3C are photographic images comparing the structural integrity of metallic casted components made using (i) a comparison coating composition comprising filler components comprising boron carbide (casted component A) and silicon carbide (casted component B) and a phosphate compound as a binder component (FIG. 3A) and (ii) a coating composition embodiment of the present disclosure comprising a graphite-based filler component (FIG. 3B); each of the metallic casted components was prepared according to a method embodiment disclosed herein using the polymer template component shown in FIG. 3C. As can be seen by comparing FIGS. 3A and 3B, the boron carbide and silicon carbide filler components deleteriously react with the phosphate compound at high temperatures, which results in structurally unstable and impure casted components, whereas the casted component made using the coating composition embodiment according to the present disclosure is clean and structurally stable.
Figure 3B:
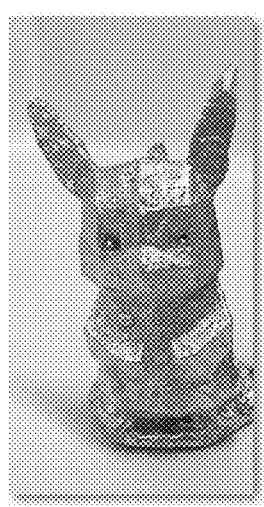
Figure 3C:
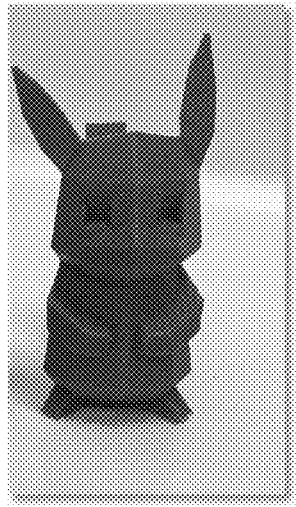

Disclosed herein are embodiments of a coating composition that can be removed from a casted component using a washing step (e.g., aqueous washing). The coating composition embodiments of the present disclosure also are compatible with myriad template materials and castable materials. The coating composition can even be used with intricate templates, including templates comprising pores and/or lattice openings. For example, see FIGS. 2C, 2D, and 3B, which show intricate casted products made using method and coating composition embodiments described herein. FIGS. 2A and 3C show the template components from which these casted products were made. In some embodiments, the coating composition provides a water-soluble coating that can be washed away from the casted component(s) with water and does not require any additional physical removal and/or chemical treatment. The coating composition and the temporary coatings formed therefrom are stable at high temperatures and do not undergo side reactions and thus do not deleteriously interact with any template and/or castable materials used during the casting process. For example, FIG. 3A shows casted products made using a method embodiment described herein, but wherein a coating composition comprising filler components from the art (e.g., boron carbide, which was used to provide casted component A; and silicon carbide, which was used to make casted component B) in combination with a phosphate-based binder component was used. Due to side reactions between the boron carbide and silicon carbide materials and the phosphate-based binder component, pure, structurally stable casted products were not obtained (FIG. 3A) in these examples, whereas a coating composition embodiment according to the present disclosure provided a structurally intact casted product (FIG. 3B) without remnants of any coating material. In such embodiments, the casted product was pure in the sense that it was free of the dried coat provided by the coating composition, or at least substantially free of the dried coat such that 20% or less (such as 15% or less, or 10% or less, or 5% or less, or 2% or less, or 1% or less) of the casted product's surface area was coated with the dried coat after washing. Coating composition embodiments of the present disclosure also are non-toxic, user-friendly, and reusable.

Coating Composition Embodiments

Disclosed herein are embodiments of a coating composition for use in investment casting methods for making casted components, such as casted metal-based, ceramic-based, and/or polymer-based components. In some embodiments, the coating composition comprises, consists essentially of, or consists of a binder component and a solvent component. In some embodiments, a solvent system comprising two different types of solvent components can be used as discussed herein. In some additional embodiments, the coating composition can further comprise a surfactant, a filler component, or a combination thereof. In some such additional embodiments, the coating composition can comprise, consist essentially of, or consist of a binder component, a solvent component (which can comprise, consist essentially of, or consist of one or two solvents), a surfactant, and/or a filler component. Representative binder components, solvent components, surfactants, and filler components are described below.

In some embodiments, the coating composition comprises a binder component. The binder component can be a compound, or mixture of compounds, that is stable at high temperatures. In particular embodiments, the binder component resists decomposition, melting, and/or side reactions at high temperatures. Side reactions can include chemical reactions that occur between the binder component and the template material to which the coating composition is added, the castable material poured into the coating formed from the coating composition, and/or other components included in the coating composition. In particular embodiments, the binder component resists decomposition, melting, and/or side reactions at temperatures above 400° C., such as temperatures ranging from 450° C. to 1750° C. (or higher), or 450° C. to 1500° C., or 450° C. to 1250° C., or 450° C. to 1000° C., or 450° C. to 900° C.

In some embodiments, the binder component is soluble in the solvent component used in the coating composition. The binder component also can exhibit at least some solubility in the solvent component but can be included in amounts wherein an excess of the binder component is present as undissolved particles. In such embodiments, the binder component can, along with the filler component discussed herein, increase the viscosity of the coating composition, which can facilitate providing an even coat of the coating composition on the template component. In particular embodiments, the binder component is soluble in the solvent component at a dissolution rate of 10 g/100 mL or greater. In some embodiments, the dissolution rate of the binder component in the solvent component is not less than 10 g/100 mL. In particular embodiments, the binder component can comprise a water-soluble inorganic salt. The inorganic salt comprises a cation component and an anion component, either of which can be multivalent or univalent. In some embodiments, a binder component makes up a majority component of the coating composition. In certain independent embodiments, phosphate glass and/or urethane compounds are not binder components.

In particular embodiments, the inorganic salt can be selected from a phosphate compound or a sulfate compound. In some representative embodiments, the binder component is a phosphate compound. Exemplary phosphate compounds can include, but are not limited to, phosphate salts (e.g., sodium phosphates, potassium phosphates, sodium phosphates, and/or lithium phosphates). In some embodiments, the phosphate compound is a sodium phosphate, such as sodium dihydrogen phosphate, sodium hydrogen phosphate, and/or trisodium phosphate. In yet other embodiments, the binder component comprises a sulfate compound, such as magnesium sulfate. In yet other embodiments, the binder component comprises boric acid. In an independent embodiment, the binder component is not phosphate glass and/or is free (or substantially free) of (or does not comprise) a urethane. For example, the binder component can be substantially free of a urethane in which case it comprises less than 10% of a urethane, such as less than 8%, or less than 6%, or less than 4%, or less than 2%, or less than 1% of a urethane.

The solvent component is selected from any solvent in which the binder component is soluble. In particular embodiments, the solvent component is a solvent in which the binder component exhibits a suitable dissolution rate, such as a dissolution rate of 10 g/100 mL or greater. In particular embodiments, the solvent component is capable of evaporating at temperatures of 145° C. or lower without having to reduce pressure. In particular embodiments, the solvent is water. In yet additional embodiments, the solvent component can comprise a solvent system comprising two or more different types of solvents, such as an aqueous solvent (e.g., water) and an organic solvent. In some embodiments, the organic solvent can be an alcohol, an ether-based solvent, or a combination thereof. The alcohol and/or ether-based solvents typically are selected to be miscible with water. Representative organic solvents include, but are not limited to, MeOH, EtOH, iPrOH, tetrahydrofuran, ether, or the like. In embodiments comprising a solvent system comprising two or more different types of solvents, the different solvent types may be used sequentially. For example, the binder component may be first combined with the aqueous solvent component and then combined with the organic solvent component.

As disclosed herein the coating composition can optionally include a surfactant and/or a polymer-based material. Such components can facilitate providing an even/uniform coating of the coating composition on the template component. In embodiments comprising a surfactant, the surfactant can be an ionic surfactant (e.g., a surfactant comprising a cationic head group, an anionic surfactant, or a zwitterionic surfactant) or a non-ionic surfactant. In some embodiments, the surfactant can be a sorbitan ester surfactant (e.g., a SPAN® surfactant), a polyoxyethylene sorbitan surfactant (e.g., a TWEEN® surfactant), or combinations. In particular embodiments, the surfactant can be selected from ammonium lauryl sulfate, sodium dodecyl sulfate ("SDS"), sodium laureth sulfate, dioctyl sodium sulfosuccinate, sodium stearate, cetrimonium bromide ("CTAB"), cetylpyridinium chloride, polyoxyethylene (20) sorbitan monolaurate, polyoxyethylene (80) sorbitan monolaurate, sorbitan monostearate, sorbitan tristearate, sorbitan monolaurate. In embodiments comprising a polymer-based material, the polymer-based material can be an acid-based polymer, such as polyacrylic acid, polymethacrylic acid, and the like.

Figure 4:
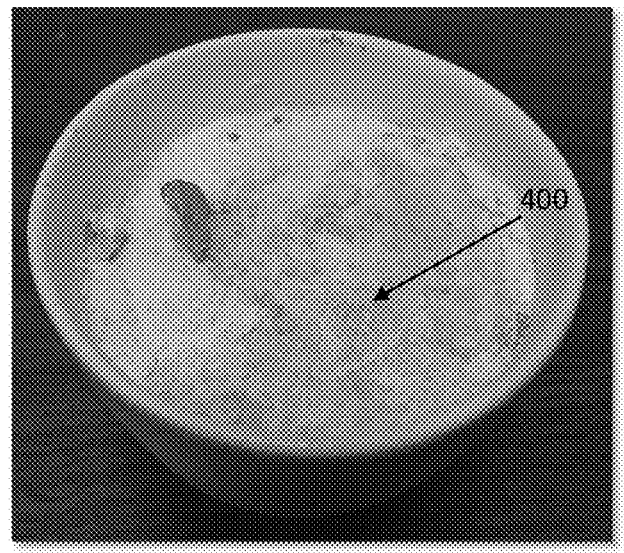
FIG. 4 is a photographic image showing that when a template component is submerged in a coating composition comprising a phosphate binder component, water, and a silica filler component, an insoluble mass is formed due to side-reactions between the coating composition components and it cannot be removed from the casted product.

Coating composition embodiments can also optionally comprise a filler component. In embodiments comprising a filler component, the filler component can be a powder-like material. The filler component can be a compound, or mixture of compounds, that is stable at high temperatures. In particular embodiments, the filler component resists decomposition, melting, and/or side reactions at high temperatures. Side reactions can include chemical reactions that occur between the filler component and the template material on which the coating composition is added, the castable material poured into the coating formed from the coating composition, and/or other components included in the coating composition. In particular embodiments, the filler component resists decomposition, melting, and/or side reactions at temperatures above 1000° C. The filler component can facilitate increasing the viscosity of the coating composition. In particular embodiments, the filler component promotes forming a slurry that has a thicker viscosity than composition to which the filler component is added. In some embodiments, the filler component is a graphite-based material. In an independent embodiment, the filler component is not silica or a sand material. FIG. 4 illustrates an insoluble mass (400) is produced that cannot be washed away from the casted product if silica is used as a filler component in combination with phosphate-based binder components in combination with an aqueous solvent. In another independent embodiment, the filler component can be silica (e.g., fused silica diatomaceous earth, or combinations thereof) when used in combination with a boric acid binder component.

Graphite materials used as filler components can have an average particle size that facilitates the ability to increase the viscosity of the saturated binder solution. In some embodiments, the graphite material can have an average particle size ranging from 400 mesh to 10 mesh, such as 325 to 10 mesh, or 270 mesh to 10 mesh, or 100 mesh to 10 mesh, or 70 mesh to 10 mesh. In some embodiments, the average particle size can range from 400 mesh to 10 mesh, or 325 to 70 mesh, or 270 mesh to 100 mesh. In particular embodiments, the filler component is graphite powder. In some embodiments, a mixture of graphite powders can be used, such as a mixture of graphite powders having different average particle sizes. In some such embodiments, a first graphite powder having a first average particle size can be added to the binder/solvent solution to form a slurry, and a second graphite powder having a different (second) average particle size can be added after the template component has been dipped in the slurry such that the second graphite powder adheres to the exterior of the coating composition present on the dipped template. In particular embodiments, the first graphite powder has first average particle size that is smaller than the second average particle size of the second graphite powder.

In an exemplary embodiment, the coating composition comprises trisodium phosphate, water, a surfactant, and graphite powder. The trisodium phosphate is used in an amount such that a saturated solution (in the water) is obtained. In such embodiments, if a surfactant is used, it can be sodium dodecyl sulfate ("SDS"), cetrimonium bromide ("CTAB"), or a combination thereof; and, if a polymer-based material is used, it can be polyacrylic acid. The amount of graphite powder used is selected such that the slurry obtained after adding the graphite powder has a viscosity that is thicker than the viscosity of the solution comprising the trisodium phosphate, water, and/or surfactant. For example, the viscosity should be sufficiently viscous such that the template component can be exposed to the slurry and removed with a coat that substantially covers the surface area of the template component such that there is minimal surface area (e.g., less than 10%, such as less than 8%, or less than 6%, or less than 4%, or less than 2%, or less than 1%) not covered by the solution. In some embodiments, a second solvent component can be used after the template component has been dipped in the slurry. For example, the second solvent may be ethanol.

In another exemplary embodiment, the coating composition comprises magnesium sulfate and water. In such embodiments, the amount of magnesium sulfate that is used is an amount that provides a slurry.

In yet another exemplary embodiment, the coating composition comprises boric acid, fused silica, and diatomaceous earth. The three components are present in amounts sufficient to provide a ratio of 1:4:4 by volume (boric acid:fused silica:diatomaceous earth). In some such exemplary embodiments, the coating composition can further comprise water.

In some embodiments, an optional diffusion barrier layer can be applied using a diffusion coating composition. In embodiments comprising this optional diffusion barrier layer, the diffusion barrier layer can be used to prevent coating materials from migrating from the mold to the castable material. The diffusion barrier layer can be provided by dipping the mold in (or adding to the mold) a diffusion coating composition comprising particles of a metal or a metal oxide, such as a refractory metal or a refractory metal oxide (e.g., erbium oxide (or "erbia"), zirconium oxide (or "zirconia"), aluminum oxide (or "alumina"), magnesium oxide, silicon dioxide (or "silica") or the like) suspended in a solvent, or it can be generated on the mold by using a chemical-based deposition method, such as atomic layer deposition or chemical vapor deposition. In some embodiments, the diffusion coating composition can comprise particles of the metal or metal oxide and an organic solvent (e.g., an alcohol, such as ethanol). In embodiments wherein the diffusion coating composition comprises suspended particles, the diffusion barrier layer can be formed by sintering or otherwise reacting the particles to provide the coating. Sintering can comprise exposing the mold to a high temperature heat treatment (e.g., temperatures of 500° C. or higher, such as 700° C. or higher, or 900° C. or higher, or 1100° C. or higher).

Method Embodiments

Also disclosed herein are embodiments of a method for using the coating composition embodiments disclosed herein. The disclosed method embodiments can be used to provide a casted component that is free, or substantially free, of the coating composition. In embodiments where the casted component is substantially free of the coating composition, the casted component can have 20% or less, such as 15% or less, or 10% or less, or 5% or less, or 2% or less, or 1% or less, of its surface area coated with the coating composition. The coating composition can be used to coat a template component, which provides the structural framework for the castable material. The coating composition can be applied using a suitable method, such as by dipping the template component in the coating composition, pouring the coating composition around the template component, spraying the coating composition onto the template, or other suitable methods for covering the template component. The template component is a sacrificial component, which is removed after coating it with the coating composition, thereby leaving a solidified coat formed from the coating composition. A castable material can be poured into the solidified coat, thereby adopting the shape of the mold (e.g., the shape of the sacrificial component). The solidified coat can be removed by exposing the solidified coat containing the castable material to water, thereby leaving behind the casted component.

In particular embodiments, the method comprises (i) providing a template component (e.g., a sacrificial component); (ii) exposing the template component to the coating composition to provide a coated template component; (iii) drying the coating composition to provide a solidified coat that covers the template component (or substantially covers the template component, e.g., such that 90% or more of the surface area of the template component is covered, such as 95%, or 98%, or 99%); (iv) heating the coated template component at a temperature sufficient to burn away the template component, leaving behind a solidified coat; (v) adding a castable material into the mold; and (vi) washing away the solidified coat to provide a casted component. Any number of layers of the coating composition can be added to the template component by repeating steps (ii)-(iii) discussed above.

In some additional embodiments, the method comprises (i) providing a template component (e.g., a sacrificial component); (ii) exposing the template component to the coating composition to provide a coated template component; (iii) drying the coating composition to provide a solidified coat that covers the template component (or substantially covers the template component, e.g., such that 90% or more of the surface area of the template component is covered, such as 95%, or 98%, or 99%); (iv) dissolving the template component using an organic solvent, leaving behind a solidified coat; (v) adding a castable material into the mold; and (vi) washing away the solidified coat to provide a casted component. Any number of layers of the coating composition can be added to the template component by repeating steps (ii)-(iii) discussed above. Organic solvents that can be used to dissolve the template component can be selected from solvents having a polarity that is less polar than methanol but more polar than heptane. In particular embodiments, the organic solvent is selected from a chlorinated hydrocarbon solvent, an aromatic hydrocarbon solvent, a ketone solvent, an ether solvent (particularly non-symmetrical ether solvents), an ester solvent, or a combination thereof. In exemplary embodiments, the organic solvent can be selected from chloroform, acetone, limonene, or tetrahydrofuran.

In some embodiments, the template component can be exposed to the coating composition by dipping the template component into the coating composition or by pouring the coating composition around the template. In some embodiments where the coating composition is poured around the template, it is first heated and then poured around the template component, which is positioned within a container. The coating composition is then allowed to cool and harden before any drying of the coated template component takes place. In some such embodiments, drying the coating composition can comprise drying the coated template component under vacuum. In particular embodiments, drying can further comprise heating the coated template component as it is dried under vacuum. In some such embodiments, the coated template component can be heated at a temperature ranging from greater than ambient temperature to 200° C., such as 50° C. to 175° C., or 70° C. to 150° C. In exemplary embodiments, the coated template component is heated at a temperature ranging from 73° C. to 150° C.

Figure 5:
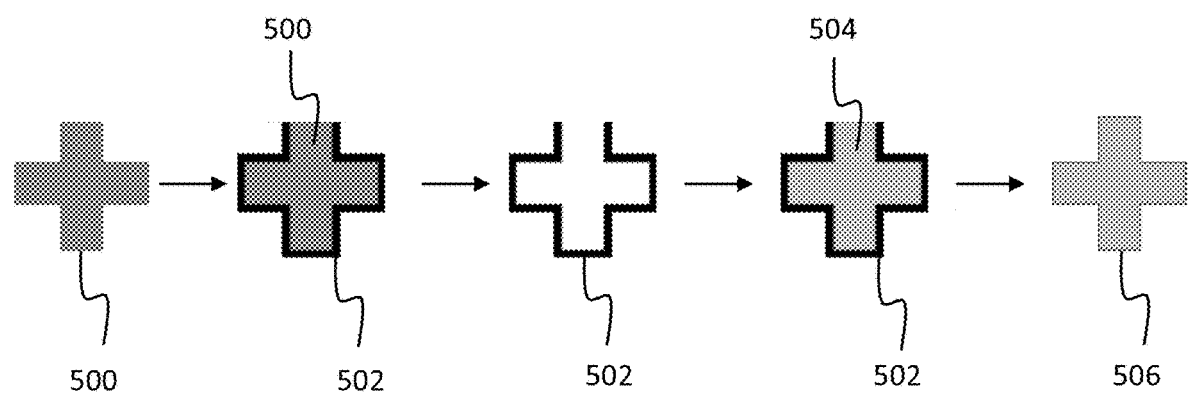
FIG. 5 is a schematic illustration of a method embodiment described in the present disclosure for using a coating composition embodiment to make a casted component.

A representative method embodiment is schematically illustrated in FIG. 5. With reference to FIG. 5, template component 500 can be coated with an embodiment of the coating composition to provide solidified coat 502 (upon drying of the coating composition) formed on the template component. Template component 500 can be removed using a technique described herein to leave behind the solidified coat 502. Castable material 504 can then be poured into solidified coat 502 and then the solidified coat can be removed with water to reveal a casted product 506.

In some embodiments, the method can further comprise adding an additional filler component to the coated template component. In such embodiments, the additional filler component can be added to the coated template component after it has been exposed to the coating composition and before drying the coating composition.

The method can also further comprise placing the dried coated template component in a container that comprises a sand component, such as a refractory sand (e.g., zirconia sand, fused silica, or the like). In such embodiments, the dried coated template component can be substantially submerged in the sand component. The sand component can be used to increase the strength of the solidified coat by providing a solid environment around the dried coated template that can prevent deformation of the solidified coat, particularly after the template component has been removed and as the castable material is added to the mold. In such embodiments, the sand component is not a filler component and is not considered part of the coating composition.

In yet additional embodiments, the method can further comprise heating the coating composition to increase the amount of binder component that is dissolved in the solvent component. In such embodiments, this additional heating step can comprise heating the binder/solvent component solution at a temperature of greater than 25° C. to 110° C. or less (e.g., greater than 25° C. to 100° C., or 25° C. to 90° C., or 25° C. to 80° C.).

In some method embodiments, the template component can first be exposed to a coating composition that comprises the binder component, the solvent component, and optionally a surfactant and/or filler component. Then, after drying the coated template component, the method can further comprise exposing the dried coated template component to a second solvent component, such as an organic solvent. This sequential exposure step using a dual solvent component system can help promote an even and strong coating of the binder component, particularly in regions of the coating that are in contact with the template component. Without being limited to a single theory of operation, it currently is believed that this dual solvent component system can prevent situations where the binder component is leached away from the coating (and/or leached away from being in contact with the template component), by the first solvent component because the second solvent component helps to limit the amount of binder component removed upon evaporation of the first solvent component. In yet some other embodiments, leaching can be avoided or reduced by using a freeze drying technique for the drying step, such that the first solvent is removed by freeze drying the coated template component. In embodiments that do not use freeze drying, the solvent component (or solvent components) can be dried using an air drying technique and/or drying the coated template component at a temperature ranging from 25° C. to 150° C. or less (e.g., greater than 25° C. to 140° C., or 25° C. to 120° C., or 25° C. to 100° C.). Such drying techniques can be performed at ambient pressure (or higher or lower pressures).

The template component is removed by heating the dried coated template component. Such heating can be conducted at a temperature sufficient to melt, sublime, or burn away the template component (e.g., a polymeric material). Other template materials, however, are compatible with the disclosed method embodiments, including metal, ceramic, or other types of template components. In some embodiments, this heating step can be conducted at temperatures above 350° C., such as 400° C. or higher, or 600° C. or higher, or 800° C. or higher, or 900° C. or higher, or 1000° C. or higher, or 1500° C. or higher, or even 1700° C. or higher. Embodiments of the coating composition disclosed herein are stable at these high temperatures and thus will not degrade and/or undergo side reactions. In some embodiments, if a sand component is desired to be used to help stabilize the solidified coat, the dried coated template component can be added to a container comprising the sand component prior to the heating step.

After the template component has been removed by the heating step, the castable material can be added to the resulting mold. Numerous types of castable materials are compatible with the solidified coat formed according to the method embodiments disclosed herein. The castable material can include metal-based materials, ceramic-based materials, and/or polymer-based materials. In some embodiments, the castable material is a molten metal-based material. The coating composition embodiments of the present disclosure are compatible with different types of castable materials, including those that require high temperatures to facilitate providing a molten or fluid form of the material and thus are not deleteriously affected (in terms chemistry and/or physical stability) when the hot molten/fluid material is added into the solidified coat. In some embodiments, the castable material can be a metal-based material, which can be selected from tin, a Babbitt alloy, bismuth, cadmium, lead, magnesium, zinc, aluminum, aluminum bronze, beryllium copper, manganese bronze, silver, brass, gold, copper, iron, uranium, cupronickel, manganese, beryllium, carbon steel, nickel, cobalt, stainless steel, palladium, and alloys thereof and/or any mixtures of any such components and/or alloys thereof. Some exemplary alloys can include, but are not limited to, nickel-based alloys, such as nickel-copper alloys (e.g., Monel® or Incoloy®), nickel-molybdenum-chromium superalloys (e.g., Hastelloy®), or nickel-chromium superalloys (e.g., Inconel®). In some embodiments, the castable material can be selected from polyetherketone, polyether ether ketone, polyphenylene sulfide, polyamide-imide, polysulfone, high-density polyethylene, or another thermoplastic polymer. In an independent embodiment, the castable material can be a glass material. In some embodiments, the castable material is allowed to cool after being added to the solidified coat. In an independent embodiment, any such cooling step does not comprise cooling by contacting the solidified coat with a solvent.

In yet additional embodiments, the method can further comprise forming a diffusion barrier layer on, or within, the mold prior to adding the castable material. In such embodiments, the diffusion barrier layer can be used to prevent or reduce leaching of components from the mold to the castable material. In particular method embodiments, the diffusion barrier layer can be introduced by exposing a surface of the mold (e.g., an interior and/or exterior surface of the mold) to a diffusion barrier coating composition as described herein, such as by dipping the mold into the barrier coating composition. In such embodiments, the method can further comprise sintering the particles of the diffusion barrier coating composition using a high temperature heat treatment. For example, after exposing the mold to the diffusion barrier coating composition, the mold can be heated at a temperature ranging from 500° C. or higher, such as 700° C. or higher, or 900° C. or higher, or 1100° C. or higher. In some other embodiments, the diffusion barrier layer can be added to the mold in situ, such as by using a deposition method like chemical vapor deposition or atomic layer deposition. In such embodiments, the mold can be placed in proximity to one or more diffusion barrier layer precursors, such as a gaseous metal halide or a metal-ligand complex. In embodiments using chemical vapor deposition, a gaseous metal halide can be placed in proximity to the mold and then exposed to heat so as to promote formation of a metal-based diffusion barrier coating on the mold. In yet other embodiments using chemical vapor deposition, a gaseous metal halide and an oxygen source can be placed in proximity to the mold and then exposed to heat so as to promote formation of a metal oxide-based diffusion barrier coating on the mold. In embodiments using atomic layer deposition, the mold can be exposed to a metal-ligand complex and another precursor component (e.g., $O_2$, $H_2$, and/or ozone), either simultaneously or sequentially, which can interact at the surface of the mold to provide the desired metal-based or metal oxide-based diffusion barrier layer. This process can be repeated to provide multiple layers of the diffusion barrier layer.

The method can further comprise removing the solidified coat from the casted component. In particular embodiments, the solidified coat is removed after castable material has been cooled. In some embodiments, removing the solidified coat is accomplished by exposing the solidified coat to water, such as by rinsing the solidified coat with water, dipping the solidified coat in water, or any other suitable technique to promote dissolving the solidified coat away from the casted metal-based component. In an independent embodiment, the solidified coat does not require ablation to be removed and thus the method does not comprise an ablation step and/or does not require using an ablation station to remove the solidified coat.

Overview of Several Embodiments

Disclosed herein are embodiments of a coating composition comprising: a binder component; and a solvent component in which the binder component is soluble at a dissolution rate of 10 g/100 mL or higher; and wherein the binder component does not substantially decompose, melt, or undergo side reactions at temperatures from 400° C. to 1700° C.

In some embodiments, the solvent component is an aqueous solvent, an organic solvent, or a combination thereof.

In any or all of the above embodiments, the organic solvent is an alcohol, an ether-based solvent, or a combination thereof.

In any or all of the above embodiments, the binder component is a water-soluble inorganic salt comprising a multivalent anion and/or cation, a univalent anion and/or cation, or a combination thereof.

In any or all of the above embodiments, the binder component is a phosphate compound.

In any or all of the above embodiments, the binder component is selected from sodium dihydrogen phosphate, sodium hydrogen phosphate, trisodium phosphate, sodium dihydrogen phosphate, sodium hydrogen phosphate, trisodium phosphate, trisodium phosphate, or a combination thereof.

In any or all of the above embodiments, the binder component is trisodium phosphate.

In any or all of the above embodiments, the binder component is a sulfate compound.

In any or all of the above embodiments, the binder component is magnesium sulfate.

In any or all of the above embodiments, the binder component is present in an amount greater than that which can be dissolved in the solvent component.

In any or all of the above embodiments, the coating composition further comprises a surfactant, a polymer-based material, or a combination thereof.

In any or all of the above embodiments, the coating composition comprises the surfactant component and the surfactant is selected from ammonium lauryl sulfate, sodium dodecyl sulfate, sodium laureth sulfate, dioctyl sodium sulfosuccinate, sodium stearate, cetrimonium bromide, cetylpyridinium chloride, polyoxyethylene (20) sorbitan monolaurate, polyoxyethylene (80) sorbitan monolaurate, sorbitan monostearate, sorbitan tristearate, sorbitan monolaurate, or a combination thereof.

In any or all of the above embodiments, the coating composition comprises the polymer-based material and the polymer-based material is selected from polyacrylic acid, polymethacrylic acid, or a combination thereof.

In any or all of the above embodiments, the coating composition further comprises a filler component.

In any or all of the above embodiments, the filler component comprises graphite powder.

In any or all of the above embodiments, the filler component comprises a combination of two types of graphite powder selected from a first graphite powder and a second graphite powder, wherein the first graphite powder has an average particle size that is larger than the second graphite powder.

In any or all of the above embodiments, the coating composition does not comprise phosphate glass or a urethane.

In any or all of the above embodiments, the coating composition comprises trisodium phosphate, water, and graphite powder.

In any or all of the above embodiments, the coating composition comprises trisodium phosphate, water, cetrimonium bromide, and graphite powder.

In any or all of the above embodiments, the coating composition comprises trisodium phosphate, water, and polyacrylic acid.

In any or all of the above embodiments, the coating composition comprises a binder component selected from a phosphate compound; water; a graphite powder; and either (i) a non-ionic surfactant or (ii) an acid-based polymer.

Also disclosed herein are embodiments of a method, comprising: (i) providing a template component; (ii) exposing the template component to a coating composition comprising a binder component and a solvent component to provide a coated template component, wherein the binder component is soluble in the solvent component at a dissolution rate of 10 g/100 mL or higher and wherein the binder component does not decompose, melt, or undergo side reactions at a temperature of 500° C. or higher; and (iii) drying the coating composition to provide a solidified coat that covers, or substantially covers the template component.

In some embodiments, the method further comprises (iv) heating the coated template component at a temperature sufficient to burn away the template component, leaving behind the solidified coat; (v) adding a castable material into the solidified coat; and (vi) washing away the solidified coat to provide a casted component.

In any or all of the above embodiments, one or more layers of the coating compositions are added to the coated template component by repeating steps (ii)-(iii).

In any or all of the above embodiments, the method further comprises adding an amount of a filler component to the exterior of the coated template component, wherein the filler component can be the same or different as any filler component in the coating composition and/or can have the same or different average particle size as any filler component in the coating composition.

In any or all of the above embodiments, the method further comprises exposing the coated template component to an organic solvent component prior to drying the coating composition to thereby facilitate precipitating a salt from the coating composition.

In any or all of the above embodiments, the method further comprises forming a diffusion barrier layer on the mold.

In any or all of the above embodiments, drying the coating composition comprises allowing the coating composition to cool and solidify at ambient temperature; freeze-drying the coating composition; and/or heating the coating composition at a temperature ranging from higher than ambient temperature to 150° C. at normal or reduced pressure.

In any or all of the above embodiments, the castable material is selected from a metal-based material, a ceramic-based material, a polymer-based material, or a combination thereof.

In any or all of the above embodiments, the castable material is selected from tin, a Babbitt alloy, bismuth, cadmium, lead, magnesium, zinc, aluminum, aluminum bronze, beryllium copper, manganese bronze, silver, brass, gold, copper, iron, uranium, cupronickel, manganese, beryllium, carbon steel, nickel, cobalt, stainless steel, palladium, and alloys thereof and/or any mixtures of any such components and/or alloys thereof.

In any or all of the above embodiments, the solidified coat is washed away by exposing the solidified coat to water.

In any or all of the above embodiments, exposing the solidified coat to water does not comprise ablation.

EXAMPLES

Example 1

In this example, a coating composition comprising a combination of boric acid, fused silica, and diatomaceous earth (at a ratio of 1:4:4 by volume) was poured around a plastic part in a crucible. After burning out the plastic component, a strong solidified coat was formed from the coating composition. Molten metal, either tin or aluminum, was poured into the solidified coat and allowed to cool. After cooling, the solidified coat was removed using an aqueous wash.

Example 2

In this example, a coating composition comprising a combination of boric acid, fused silica, diatomaceous earth (at a ratio of 1:4:4 by volume) and water was poured around a plastic part in a crucible. The slurry was then dried in a freeze dryer before burning out the plastic part. This process provided a clean surface finish. After burning out the plastic component, a strong solidified coat was formed from the coating composition. Molten metal, either tin or aluminum, was poured into the solidified coat and allowed to cool. After cooling, the solidified coat was removed using an aqueous wash.

Example 3

In this example, a thick coating composition comprising magnesium sulfate in water was packed around a plastic part in a crucible and subjected to freeze-drying before the burnout step. After the burnout step to remove the plastic part, a molten metal was poured into the solidified coat formed from the coating composition and allowed to cool. In this example, the temperature of the burnout step and the temperature of the molten metal were not above 1124° C.

Example 4

In this example, trisodium phosphate (TSP) was used as a binder, along with a graphite powder and water, which also were present in the coating composition. A printed, plastic part was then dipped (one or more times) in the coating composition and allowed to dry. The part is then placed in a crucible and the space around it is filled in with a fine refractory sand, such as zirconia sand or fused silica to add support. The printed, plastic was then burned away, and the molten metal was added into the solidified coat. Once the metal cooled, the sand was poured away and the solidified coat was washed off of the metal part in a matter of seconds without any chipping or scrubbing.

Example 5

In this example, a coating composition comprising 50 g trisodium phosphate, 100 mL water, 20 g graphite powder, and 1 g CTAB was used. Five coats were applied to a template component, with a 2 minute soak in ethanol and air drying between each coat. The coated template component was placed in a crucible and supported with sand and burned in a furnace at 700° C. for 4 hours to remove the template component. The crucible was removed from the furnace and an aluminum silicon magnesium alloy was poured into the hot solidified coat. The cast was allowed to cool completely and then swished in a bucket of water to remove the bulk of the solidified coat and then washed clean in running water to provide the casted product.

Example 6

In this example, a coating composition comprising 80 g trisodium phosphate, 100 mL water, and 10 g polyacrylic acid was used. A slurry was prepared with these components and kept at 90° C. and the template component was dipped into the solution and then allowed to cool, forming an even coating. The coating process was repeated 6 times to give a thick coating. The resulting coated templated component was supported with trisodium phosphate powder in a crucible and the template component was burned out in the furnace overnight at 650° C. The resulting solidified coat was removed from the furnace and molten tin was poured into the solidified coat and allowed to cool at room temperature. The solidified coat was removed by soaking in water to provide the casted product.

Example 7

In this example, a coating composition comprising 500 g of anhydrous trisodium phosphate powder and 600 g water was used. A slurry was prepared with these two components and kept at a temperature of 90° C. to 105° C. and the slurry was poured in a container holding the template component such that the coating composition was allowed to surround the template component. The coated template component was allowed to harden and dry in a vacuum oven after cooling.

Example 8

In this example, a coating composition comprising 750 g of anhydrous trisodium phosphate powder and 600 g water was used. A slurry was prepared with these two components and kept at a temperature of 90° C. to 105° C. and the slurry was poured in a container holding the template component such that the coating composition was allowed to surround the template component. The coated template component was allowed to harden and dry in a vacuum oven after cooling.

In view of the many possible embodiments to which the principles of the present disclosure may be applied, it should be recognized that the illustrated embodiments are only preferred examples and should not be taken as limiting the scope of the present disclosure. Rather, the scope is defined by the following claims. We therefore claim as our invention all that comes within the scope and spirit of these claims.

We claim:

1. A coating composition, comprising:
   a binder component, wherein the binder component is trisodium phosphate;
   a solvent component, wherein the solvent component is water;
   a surfactant, wherein the surfactant is cetrimonium bromide; and
   a filler, wherein the filler is graphite powder.

2. The coating composition of claim 1, wherein the solvent component further comprises an organic solvent.

3. The coating composition of claim 2, wherein the organic solvent is an alcohol, an ether-based solvent, or a combination thereof.

4. The coating composition of claim 1, further comprising sodium dihydrogen phosphate, sodium hydrogen phosphate, or a combination thereof.

5. The coating composition of claim 1, wherein the binder component is present in an amount greater than that which can be dissolved in the solvent component.

6. The coating composition of claim 1, wherein the coating composition further comprises a polymer-based material.

7. The coating composition of claim 6, further comprising ammonium lauryl sulfate, sodium dodecyl sulfate, sodium laureth sulfate, dioctyl sodium sulfosuccinate, sodium stearate, cetylpyridinium chloride, polyoxyethylene (20) sorbitan monolaurate, polyoxyethylene (80) sorbitan monolaurate, sorbitan monostearate, sorbitan tristearate, sorbitan monolaurate, or a combination thereof.

8. The coating composition of claim 6, wherein the polymer-based material is selected from polyacrylic acid, polymethacrylic acid, or a combination thereof.

9. The coating composition of claim 1, wherein the graphite powder comprises a first graphite powder and a second graphite powder, wherein the first graphite powder has an average particle size that is larger than the second graphite powder.

10. The coating composition of claim 1, wherein the coating composition does not comprise phosphate glass or a urethane.

* * * * *